(12) United States Patent
Matsuzuki (10) Patent No.: US 6,229,554 B1
(45) Date of Patent: May 8, 2001

(54) IMAGE FORMING APPARATUS AND METHOD FOR FORMING AN IMAGE BY OVERLAPPING AREAS OF DIFFERENT COLORS WITH EACH OTHER

(75) Inventor: Masato Matsuzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/464,451

(22) Filed: Dec. 16, 1999

(30) Foreign Application Priority Data

Mar. 1, 1999 (JP) .................................................. 11-053305

(51) Int. Cl.[7] .................................................. G03G 15/01
(52) U.S. Cl. .......................... 347/115; 347/116; 358/1.9; 358/530; 430/42
(58) Field of Search .................................... 347/115, 116, 347/131; 430/42, 44; 382/163, 167; 358/530, 518, 1.9

(56) References Cited

U.S. PATENT DOCUMENTS

| 5,617,192 | 4/1997 | Tonomoto et al. . |
| 5,722,003 | 2/1998 | Suzuki et al. . |
| 5,754,919 | 5/1998 | Sugimoto et al. . |

FOREIGN PATENT DOCUMENTS

| 63-271275 | 11/1988 | (JP) . |
| 63-300259 | 12/1988 | (JP) . |
| 8-166699 | 6/1996 | (JP) . |
| 8-166700 | 6/1996 | (JP) . |
| 9-174942 | 7/1997 | (JP) . |
| WO95/25988 | 9/1995 | (WO) . |

*Primary Examiner*—Joan Pendegrass
(74) *Attorney, Agent, or Firm*—Armstrong, Westerman, Hattori, McLeland & Naughton, LLP (57) ABSTRACT

An image forming apparatus has a processing part which forms a color image from an input image by overlapping areas of different colors with each other such that the different colors have different sizes based on a conspicuous color order caused by color displacement.

11 Claims, 10 Drawing Sheets

NO COLOR DISPLACEMENT

FIG.1A
PRIOR ART

100-μm DISPLACEMENT ALLOWANCE

FIG.3A CASE A Y(YELLOW) IS DISPLACED OUT

FIG.3B CASE B M(MAGENTA) IS DISPLACED

| COLOR | LASER POWER (mW) | LINE THICKNESS ($\mu$)PER DOT |
|---|---|---|
| Y (YELLOW) | 3.7 | 100 |
| M (MAGENTA) | 4.0 | 140 |
| C (CYAN) | 4.4 | 180 |
| K (BLACK) | 4.8 | 220 |

NO COLOR DISPLACEMENT

FIG.7A

120-μm DISPLACEMENT ALLOWANCE

| COLOR | OUTPUT 1 | | OUTPUT 2 | |
|---|---|---|---|---|
| | LASER POWER (mW) | LINE THICKNESS PER DOT ($\mu$) | LASER POWER (mW) | LINE THICKNESS PER DOT ($\mu$) |
| YELLOW | 4.4 | 180 | 3.7 | 100 |
| MAGENTA | 4.4 | 180 | 3.7 | 100 |
| CYAN | 4.4 | 180 | 3.7 | 100 |
| BLACK | 4.4 | 180 | 3.7 | 100 |

FIG.10

IMAGE FORMING APPARATUS AND METHOD FOR FORMING AN IMAGE BY OVERLAPPING AREAS OF DIFFERENT COLORS WITH EACH OTHER

BACKGROUND OF THE INVENTION

1. Field of the Invention

The present invention generally relates to image forming apparatuses and methods for forming an image which form a color print image by printing a plurality of colors on one medium on which one color image is printed over other color images and, more particularly, to an image forming apparatus and a method for forming an image in which the accuracy of color placement on a medium is improved.

2. Description of the Related Art

Especially in an electronic color printer, a color image is formed by mixing toners of black and three primary colors: yellow, magenta and cyan.

There are methods for processing transcriptions of four color images as follows: a method using four photosensitive drums, in which one photosensitive drum is provided for each color and a transcription is processed for each color image on a sheet in sequence; a method using a single photosensitive drum, in which a toner image is developed on the photosensitive drum by selectively using one of four developing devices corresponding to one of four colors and a transcription is performed four times on a sheet; and a method using a single photosensitive drum and a transcription medium, in which each of four color toner images is developed on the transcription medium and the overlapped four color images are copied on a sheet at once. The methods have a disadvantage in that displacement between two color images occurs.

To eliminate deterioration of image quality caused by the displacement, each color has to be overlapped with an accuracy of a few $\mu$ms. To achieve this accuracy, improvement of an accuracy of a photosensitive drum's rotation, improvement of an accuracy of transferring a sheet, or auto adjustment techniques by detecting color displacements have been discussed. However, it is still difficult to achieve enough accuracy to overlap colors and these improvements require a high cost.

Recently, it is desired to improve image quality and to reduce cost related to improving the color displacement.

In a conventional color image forming method, the following method is generally used.

For example, to produce a red color, two colors, yellow and magenta of the three primary colors, are overlapped on a sheet. However, when a red color image is formed, each of the yellow image and magenta image is processed in sequence but separately: that is, the yellow image and the magenta image are processed at slightly different times. Therefore, transcription of each color image is placed at a slightly different position on the sheet. When the displacement of color images is significant, the expected color is not produced and image quality is deteriorated.

Details of the above-mentioned displacement will be explained with reference to FIGS.1A and 1B.

Figure 1A:
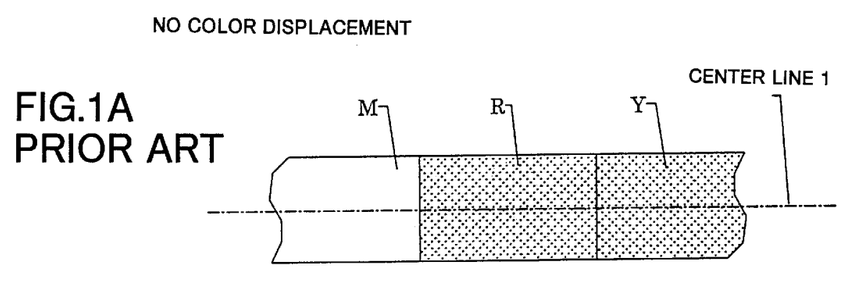
FIG. 1A shows a diagram illustrating an example of a conventional color overlapped image in which there is no color displacement and FIG. 1B shows a diagram illustrating an example of a conventional color overlapped image which has displacement at a 100-$\mu$m displacement allowance.

FIG. 1A shows a diagram illustrating an example of a conventional color overlapped image in which there is no color displacement.

In this figure, M indicates magenta, R indicates red, and Y indicates yellow.

In a conventional method, only when a centerline of a magenta straight line is coincident with a centerline of a yellow straight line, will the color displacement not occur so that a clear red straight line is formed.

Figure 1B:
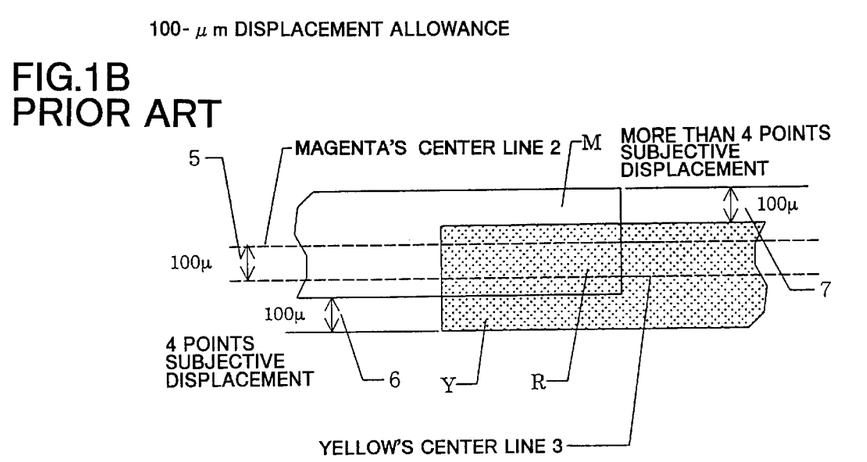

FIG. 1B shows a diagram illustrating an example of a color overlapped image which has displacement at a 100-$\mu$m displacement allowance in a conventional manner.

It should be noted that the allowance displacement means a physical minimum amount at which human eyes begin to discern that two images are physically displaced. That is, the 100-$\mu$m allowance displacement indicates that human eyes begin to discern a displacement between two images when the two images are displaced by at least 100 $\mu$m. On the contrary, human eyes can not discern a displacement between two images when the two images are displaced by less than 100 $\mu$m.

In FIG. 1B, a displacement 5 is a 100-$\mu$m difference between magenta's centerline and yellow's centerline. In a conventional method, because the magenta line and the yellow line are of the same thickness, the displacement 5 causes a 100-$\mu$m difference 6 between lower edges of the magenta straight line and the yellow straight line and also causes a 100-$\mu$m difference 7 between upper edges of the magenta straight line and the yellow straight line.

Even with the discussed improvement of the accuracy of a photosensitive drum's rotation, the improvement of the accuracy of transferring a sheet and the auto adjustment techniques by detecting color displacements, it is still difficult to eliminate the color displacement when a certain color line is formed by overlapping two lines having the same thickness.

SUMMARY OF THE INVENTION

It is a general object of the present invention to provide an Image forming apparatus and a method for forming an image with a color image technology that eliminates the above-mentioned disadvantages.

A more specific object of the present invention is to provide an image forming apparatus and a method for forming an image with a color image technology in which some color displacement is allowed while maintaining a high image quality at a low cost.

The above objects of the present invention are achieved by an image forming apparatus including a processing part forming a color output image from an input image by overlapping areas of different colors with each other, wherein the areas of the different colors have different sizes. Therefore, the present invention can reduce deterioration caused by a color displacement.

Furthermore, the above objects of the present invention are achieved by a method for forming an image comprising the steps of: (a) forming a color output image from an input image by overlapping areas of different colors with each other, wherein the areas of the different colors have different sizes. Therefore, the present invention can provide a method to reduce deterioration caused by a color displacement.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Figure 2:
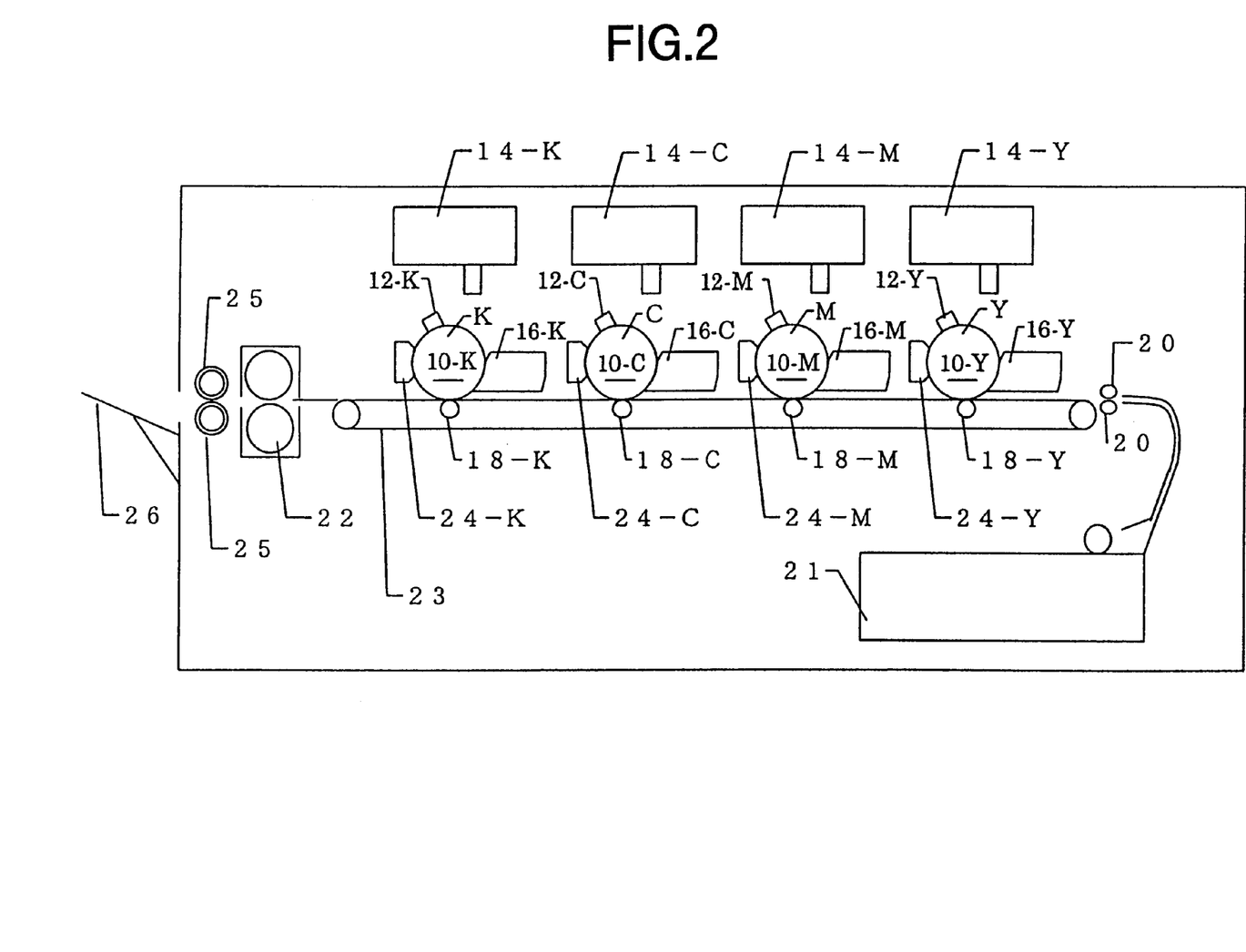
FIG. 2 shows a diagram illustrating a whole construction according to a first embodiment of the present invention.

FIG. 2 shows a diagram illustrating a whole construction according to a first embodiment of the present invention.

Referring to FIG. 2, four image forming units Y, M, C, and K are provided in sequence and correspond to four colors: yellow (Y), magenta (M), cyan (C), and black (K), respectively.

All four image forming units are constructed in the same manner. That is, the forming units Y, M, C and K include photosensitive drums 10-Y, 10-M, 10-C and 10-K in accordance with each color. Further, the photosensitive drums 10-Y, 10-M, 10-C and 10-K are uniformly charged by electrostatic charge devices 12-Y, 12-M, 12-C, and 12-K in accordance with each color.

Moreover, four sets of bit map data corresponding to four colors are provided beforehand, and in accordance with each color, photostatic latent images are exposed on the photosensitive drums based on the bit map data by laser beam devices. Thereby, a yellow photostatic latent image, a magenta photostatic latent image, a cyan photostatic latent image, and a black photostatic latent image are respectively provided on the photosensitive drums 10-Y, 10-M, 10-C, and 10-K.

In accordance with each color, the photostatic latent image on the photosensitive drum is developed by a developing device. That is, a developing device 16-Y supplies yellow developing powder on the photosensitive drum 10-Y so that a yellow image is formed on the photosensitive drum 10-Y. The other developing devices 16-M, 16-C and 16-K operate in the same manner. Thereby, a magenta image, a cyan image, and a black image are respectively developed on corresponding photosensitive drums 10-M, 10-C and 10-K.

These four developed images on four photosensitive drums are transferred onto one sheet that is being conveyed by rollers 18-Y, 18-M, 18-C, and 18-K. Subsequently, cleaners 24-Y, 24-M, 24-C, and 24-K clean respectively the corresponding photosensitive drums.

Sheets are accommodated in a hopper 21. Every sheet is picked from the hopper 21 and is sent to a belt 23 by rollers 20. The sheet is conveyed to the image forming units Y, M, C, and K in sequence. After four photostatic latent images are transferred and overlap each other on the sheet, the sheet is conveyed to a fixing device 22 so that the four transferred images are fixed on the sheet and one color image is created.

The sheet is released by rollers 25 and is accommodated in a stacker 26.

Meanwhile, the present invention is based on a correlation between a physical displacement amount and a subjective displacement amount.

It is recognized that a color displacement is evaluated by two methods: a physical displacement method that measures a physical difference in pms between two images and a subjective displacement method that evaluats two images visually to determine a subjective difference between the two images. Moreover, it is discovered that the subjective displacement amount depends on a combination of two colors even if every combination has the same physical displacement amount.

The discovery is examined further by displacing one of two color straight lines in increments of 10 $\mu$m (physical displacement) from a center line of the other color straight line, and a physical displacement is evaluated by subjective displacement ranking from 1 to 5 points.

The visual evaluation by subjective displacement is indicated by one point for "very much displacement", two points for "much displacement", three points for "displacement", four points for "a little displacement", and five points for "perfect placement".

The correlation between the physical displacement amount and the subjective amount will now be explained with reference to FIGS. 3A, 3B, and 3C, according to the first embodiment of the present invention In this figure, M indicates magenta, R indicates red, and Y indicates yellow.

Figure 3A:
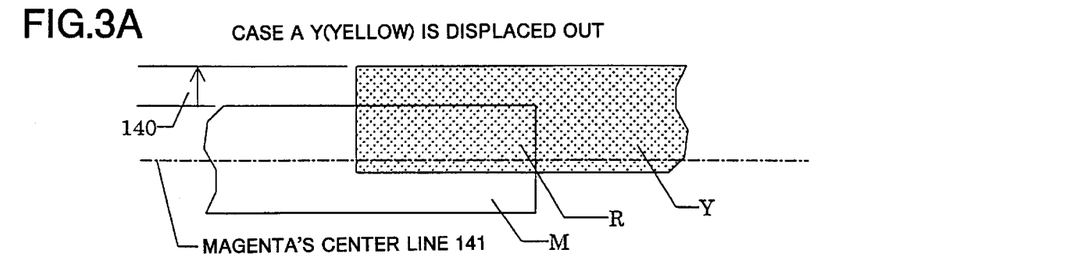
FIG. 3A shows a diagram illustrating a case A in which a yellow straight line is displaced.

FIG. 3A shows a diagram illustrating a case A in which a yellow straight line is displaced. The case A shows a red straight line being produced by overlapping a yellow straight line and a magenta straight line over each other. However, the yellow straight line Is displaced from a centerline 141 of the magenta straight line. The case A causes a displacement 140 in an upper direction.

Figure 3B:
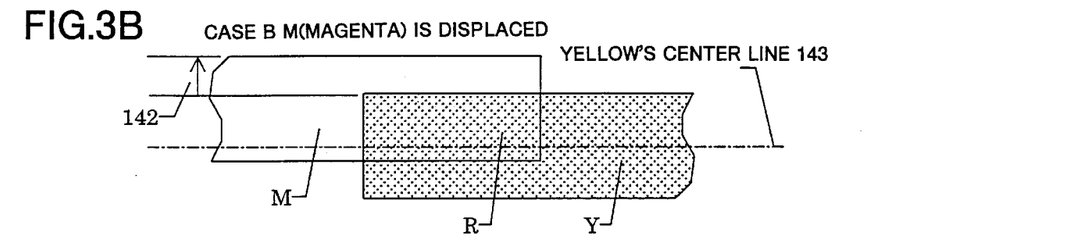
FIG. 3B shows a diagram illustrating a case B in which a magenta straight line is displaced.

FIG. 3B shows a diagram illustrating a case B in which a magenta straight line is displaced. The case B also shows a red straight line being produced by overlapping a yellow straight line and a magenta straight line over each other. However, in the case B, the magenta straight line is displaced from a centerline 143 of the yellow straight line. The case B causes a displacement 142 in an upper direction.

Figure 3C:
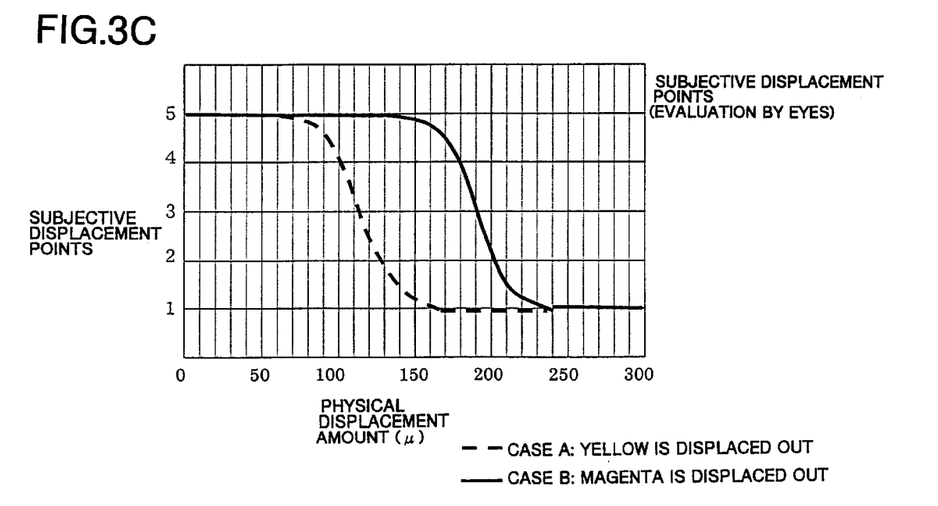
FIG. 3C is a graphical representation showing the correlation in the case A and the correlation in the case B.

FIG. 3C is a graphical representation showing the correlation In the case A and the correlation in the case B.

Referring to FIG. 3C, in the case A, approximately 100-$\mu$m physical displacement causes four point subjective displacement. On the contrary, in the case B, approximately 180-$\mu$m physical displacement causes four point subjective displacement. Thus, it can be concluded that the case B maintains subjective image quality in a good state even if the case B has a larger physical displacement than the case A.

In the same manner, other combinations of two colors are examined. It can be concluded that the brighter color has the higher point subjective displacement when the color is displaced.

Hence, a conspicuousness of color is shown by the following inequality:

Yellow (Y)>Magenta (M)>Cyan (C)>Black (K)     (i)

Thus, to suppress subjective displacement at minimum, a color towards the left in the above inequality (i) is set not to be displaced from any color on its right. That is, in a reverse order of the inequality (i), an output area of a color is set to be smaller so that the subjective displacement can be reduced. The following inequality shows output area sizes of colors:

Yellow (Y)<Magenta (M)<Cyan (C)<Black (K)     (ii)

An image forming apparatus according to the present invention is constructed based on the above experiment.

Figure 4:
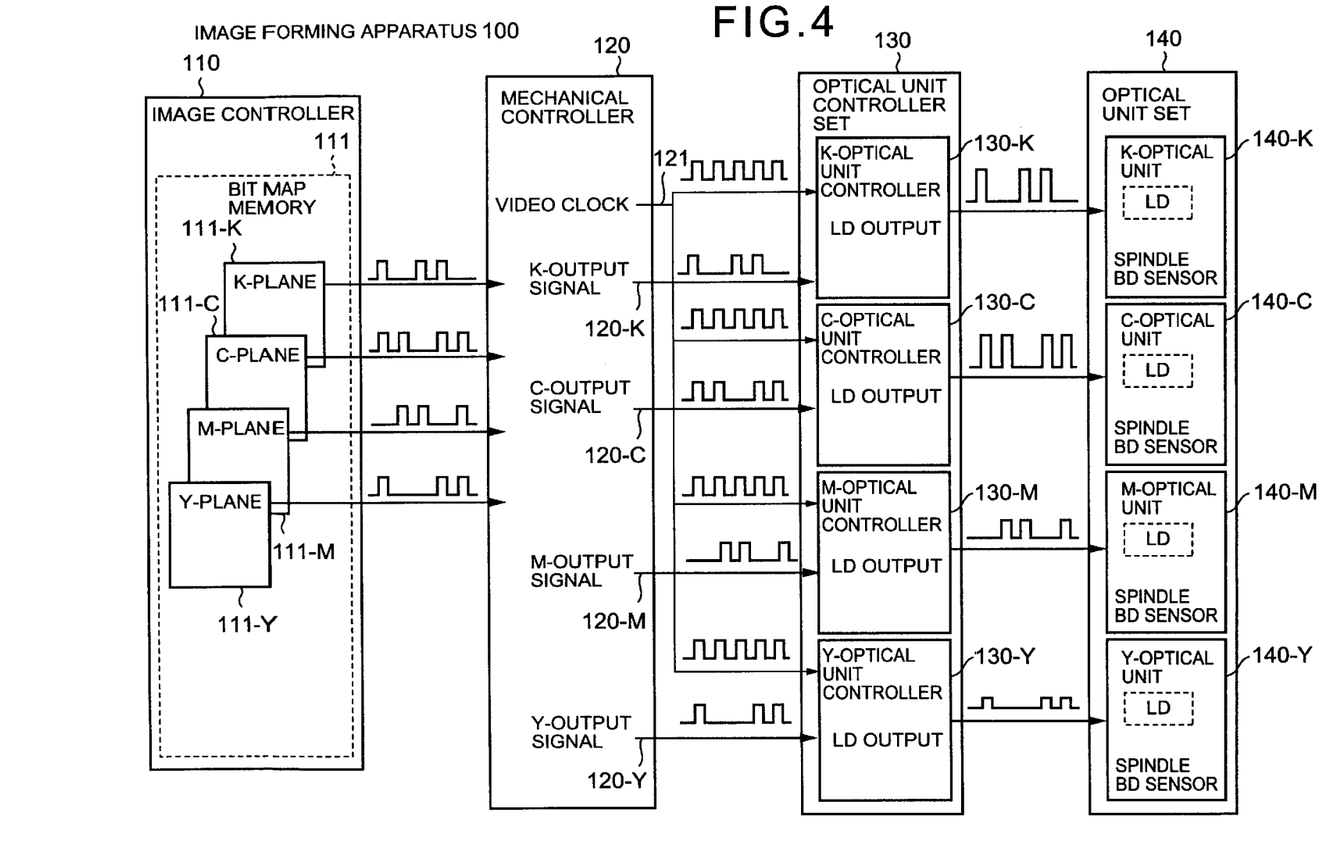
FIG. 4 shows a diagram illustrating a construction of an image forming apparatus according to the first embodiment of the present invention.

FIG. 4 shows a diagram illustrating a construction of an image forming apparatus according to the first embodiment of the present invention.

Referring to FIG. 4, the image forming apparatus 100 has mainly an image controller 110 to convert an original image to a bit map, a mechanical controller 120 to send dot signals to an optical unit, an optical unit controller set 130 to supply dot signals in accordance with predetermined laser power strengths, and an optical unit set 140 to apply optical dot signals.

The image controller 110 develops each color's bit map in a bit map memory 111. Four developed bit maps, a K-plane 111-K, a C-plane 111-C, He an M-plane 111-M, and a Y-plane 111-Y, are converted to dot signals and sent to the mechanical controller 120.

The mechanical controller 120 synchronizes the dot signals with a video clock signal 121 after having received the dot signals. Then a K-output signal 120-K, a C-output signal 120-C, an M-output signal 120-M, and a Y-output signal 120-Y are sent to the optical unit controller set 130 with the video clock signal 121.

The optical unit controller set 130 includes a K-optical unit controller 130-K controlling an LD output signal, a C-optical unit controller 130-C controlling an LD output signal, an M-optical unit controller 130-M controlling an LD output signal and a Y-optical unit controller 130-Y controlling an LD output signal. In the optical unit controller set 130, a received signal from the mechanical controller 120 is converted to another dot signal indicating laser power strength with a predetermined pulse amplitude in accordance with the inequality (ii), and is sent to the optical unit set 140. The optical unit set 140 includes a K-optical unit 140-K controlling a spindle BD sensor, a C-optical unit 140-C controlling a spindle BD sensor, an M-optical unit 140-M controlling a spindle BD sensor, and a Y-optical unit 140-Y controlling a spindle BD sensor. In accordance with the four colors, the above four optical units correspond to the laser beam devices 14-K, 14-C, 14-M, and 14-Y in FIG. 2, respectively. Each of the above four optical units emits a laser beam on a corresponding photosensitive drum so as to make a photostatic latent image thereon.

An example of predetermined laser power strength corresponding to one dot in each color will now be described with reference to FIG. 5.

Figure 5:
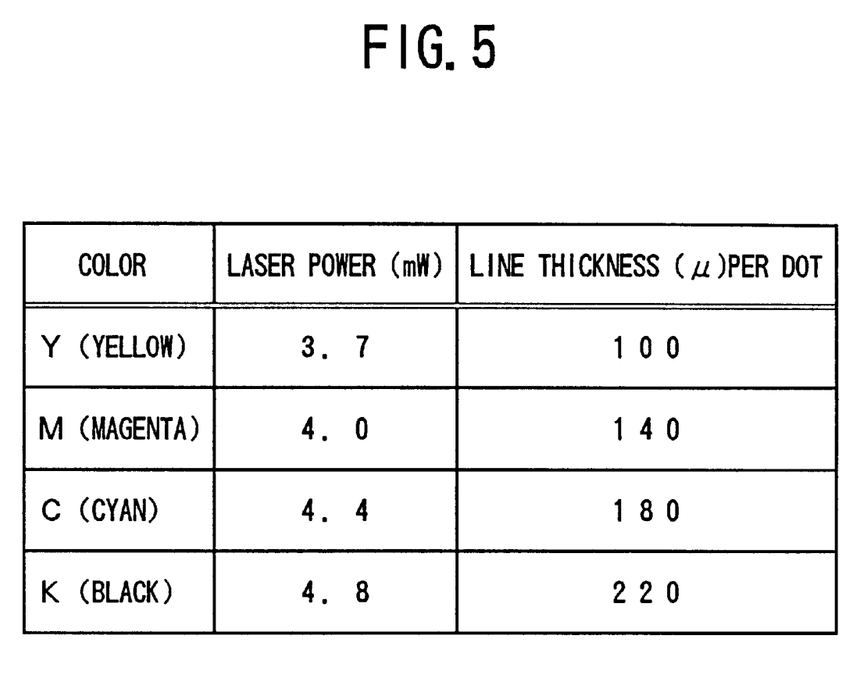
FIG. 5 shows a table of laser power strength and line thickness for each color, according to the first embodiment of the present invention.

FIG. 5 shows a table of laser power strength and line thickness for each color, according to the first embodiment of the present invention.

In FIG. 5, the example is a case of electrophotography with a 240-dpi resolution. In this example, laser power (mW) and line thickness ($\mu$m) per dot are shown for each color.

In this example, a 3.7-mW laser is emitted for yellow resulting in a yellow output image with a 100-$\mu$m line thickness per dot; a 4.0-mW laser is emitted for magenta resulting in a magenta output image with a 140-$\mu$m line thickness per dot; a 4.4-mW laser is emitted for cyan resulting in a cyan output image with a 180-$\mu$m line thickness per dot; and a 4.8-mW laser is emitted for black resulting in a black output image with a 220-$\mu$m line thickness per dot.

Based on the table shown in FIG. 5, an output image of each color corresponding to the same size input image has a different area, as shown in the following FIG. 6.

Figure 6:
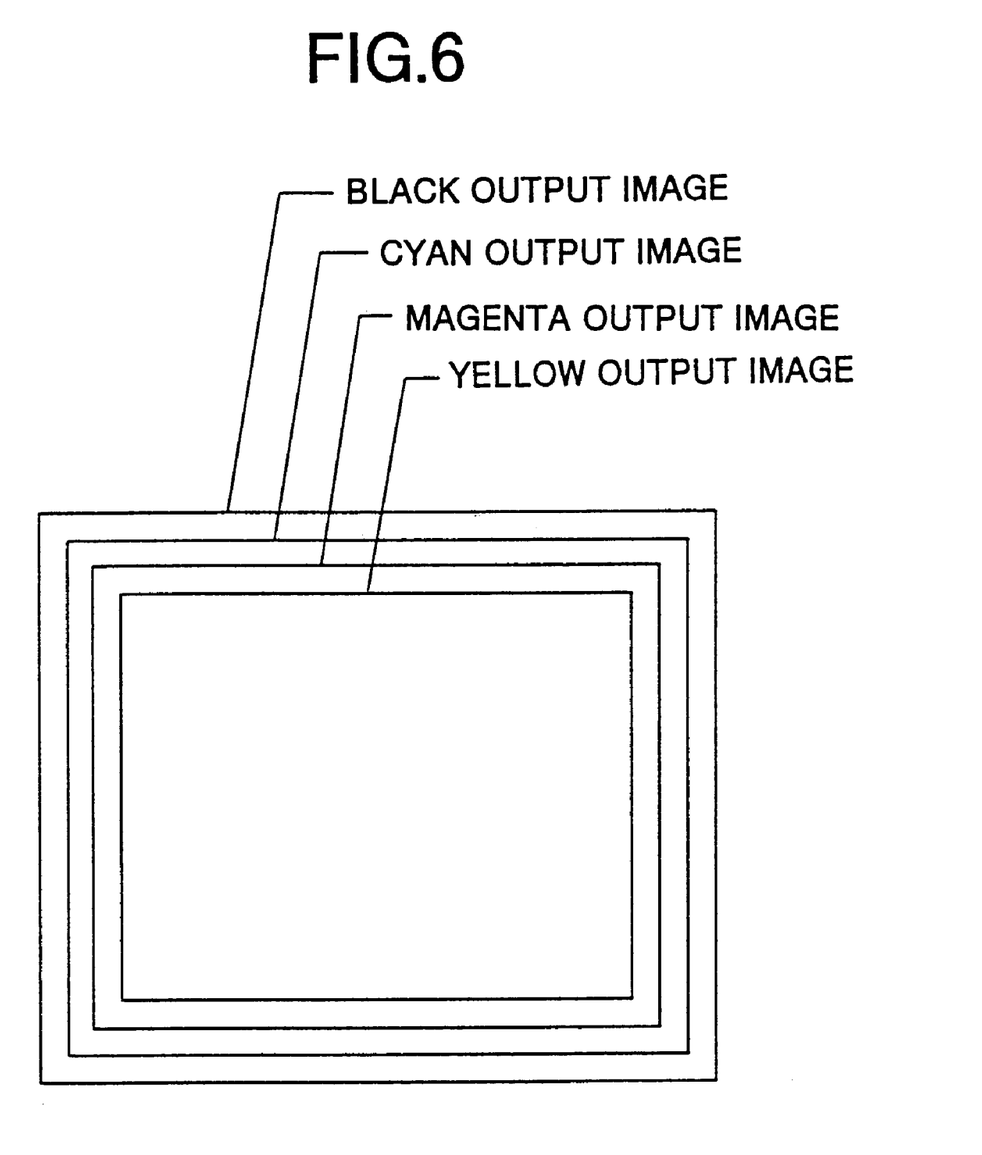
FIG. 6 shows an enlarged diagram illustrating four output images corresponding to four colors, according to the first embodiment of the present invention.

FIG. 6 shows an enlarged diagram illustrating four output images corresponding to four colors, according to the first embodiment of the present invention.

As shown in FIG. 6, with respect to the same input image, a yellow output image is the smallest; a magenta output image is slightly bigger than that of the yellow; a cyan output image is slightly bigger than that of the magenta; and a black output image is slightly bigger than that of the cyan.

Figure 7A:
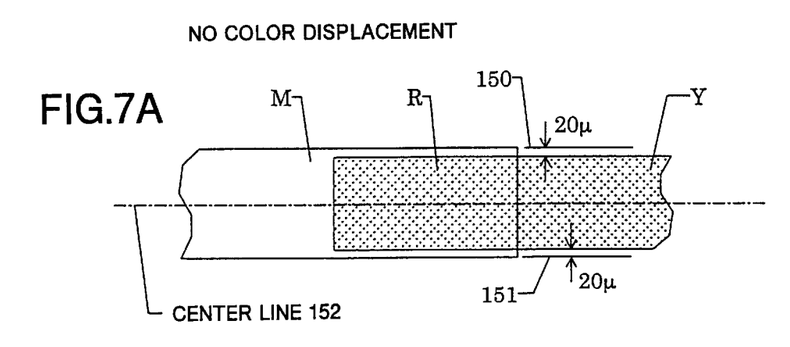
FIG. 7A shows a diagram illustrating a color overlapped image in which there is no displacement, according to the first embodiment of the present invention.

In FIG. 6, a difference in width between the innermost yellow output image and the outermost black output image at the outer most is defined as at least-120 $\mu$m physical displacement even if those two output images are positioned precisely. However, the difference is within the displacement allowance amount. Thus, the difference can be evaluated as a perfect placement by the subjective displacement amount. Details of the above will be explained as follows:

FIG. 7A shows a diagram illustrating a color overlapped image in which there is no displacement, according to the first embodiment of the present invention.

In this figure, M indicates magenta, R indicates red, and Y indicates yellow.

For example, to produce red, two colors, yellow and magenta, are overlapped on a sheet. In this case, centerlines of a magenta straight line and a yellow straight line are coincident with a centerline 152. However, in this embodiment, 20-$\mu$m differences, which are not recognized visually, between the yellow straight line and the magenta straight line are defined at upper edges and at lower edges.

Next, in a case of a color displacement between a yellow straight line and a magenta straight line, a displacement allowance according to the embodiment will be examined.

It is supposed that the yellow straight line is displaced with respect to the magenta straight line. To maintain more than four point subjective displacement, the physical displacement amount should be less than 100 $\mu$m. In this embodiment, however, referring to FIGS. 5 and 6, the yellow output image is smaller by 20 $\mu$m than each edge of the magenta output image. Thus, an actual difference of 120 $\mu$m causes a physical displacement of 100 $\mu$m. That is, an extra 20 $\mu$m is available as a margin.

On the contrary, according to the correlation as shown in FIG. 3C, when a magenta straight line is displaced with respect to a yellow straight line, more than four point subjective displacement can be maintained at less than 180-$\mu$m physical displacement. However, referring to FIGS. 5 and 6, the yellow output image is smaller by 20 $\mu$m than each edge of the magenta output image. Thus, an actual difference can be allowed until less than 160 $\mu$m.

Actually, a line image has two edges, an upper edge and a lower edge. Two displacements, one in an upper direction and the other in a lower direction, occur simultaneously.

Hence, a smaller difference between that of 120 μm and that of 160 μm is defined as the displacement allowance. Accordingly, 120 μm is defined as the displacement allowance in this case.

Figure 7B:
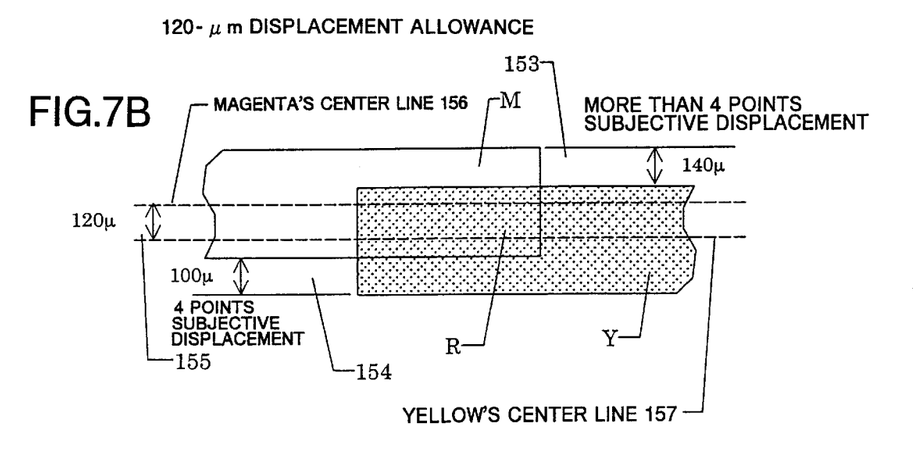
FIG. 7B shows a diagram illustrating a color overlapped image which is displaced at a 120-$\mu$m displacement allowance, according to the first embodiment of the present invention.

FIG. 7B shows a diagram illustrating a color overlapped image which is displaced at a 120-μm displacement allowance, according to the first embodiment of the present invention.

In this figure, M indicates magenta, R indicates red, and Y indicates yellow.

A displacement 155 is a difference between a centerline 156 of a magenta straight line and a centerline 157 of a yellow straight line, and is 120 μm.

In this case, an upper difference 153 is 140 μm but the subjective displacement amount is more than four points so that there is visually no displacement.

In addition, a lower difference 154 is 100 μm which is smaller than the upper difference 153, and the subjective displacement amount is four points such that a little displacement is visually recognized.

In the conventional method, each color straight line is of the same thickness so that only a a 100-μm displacement is allowed to achieve more than a four point subjective displacement. However, displacement of the present invention can be improved by 20 percent over that in the conventional method.

In this approach, a 120-μm displacement allowance is defined for a combination of magenta and cyan; a 140-μm displacement allowance is defined for a combination of yellow and cyan; and a 160-μm displacement allowance is defined for a combination of yellow and black. In any combination, the present invention can enlarge a conventional 100-μm displacement allowance by 20 μm to 60 μm.

In this embodiment, a single dot line is used as an example. Other images that have other shapes and larger areas also can be used where each color image can be depicted in the same manner. That is, for example, a magenta image is depicted as larger by 20 μm at each edge with respect to a yellow image so that an output area of the magenta image is increased. The physical displacement amount is allowed to be larger by that increase. In other words, when a difference between two thicknesses of two color lines is bigger, the displacement allowance is extended.

In this embodiment, the present invention applies to all four colors: yellow, magenta, cyan, and black. Instead, only necessary colors may be applied. For instance, in a case in which a printer does not overlap black with any other colors, the present Invention may apply to yellow, magenta and cyan. And black may be set with any thickness. Alternately, the present invention may apply selectively to a combination of any two colors.

With regard to controlling color output images in accordance with the same size of input images for each color, in a case of electrophotography, a thickness of a single dot line is controlled by using laser power so as to be a predetermined thickness in this embodiment. Instead, any one of parameters in an image forming process, such as surface electric potential of a drum, bias of a developing device or the like, may control a thickness of the single dot line in accordance with each color.

Furthermore, a method of varying output image areas only in an area in which a plurality of colors are overlapped will be now explained in the following embodiment. This modification of the present invention can extend the displacement allowance effectively.

In a printer, an input image is converted to four sets of bit map data of yellow, magenta, cyan and black. Consequently, after conversion, it is easy to judge if a color is for a single color or for a secondary color. When the color is for a secondary color, a laser power strength for the color is changed to adjust an output area of the color.

A whole construction in the following embodiment is the same as that in the first embodiment and the explanation thereof will be omitted.

Figure 8:
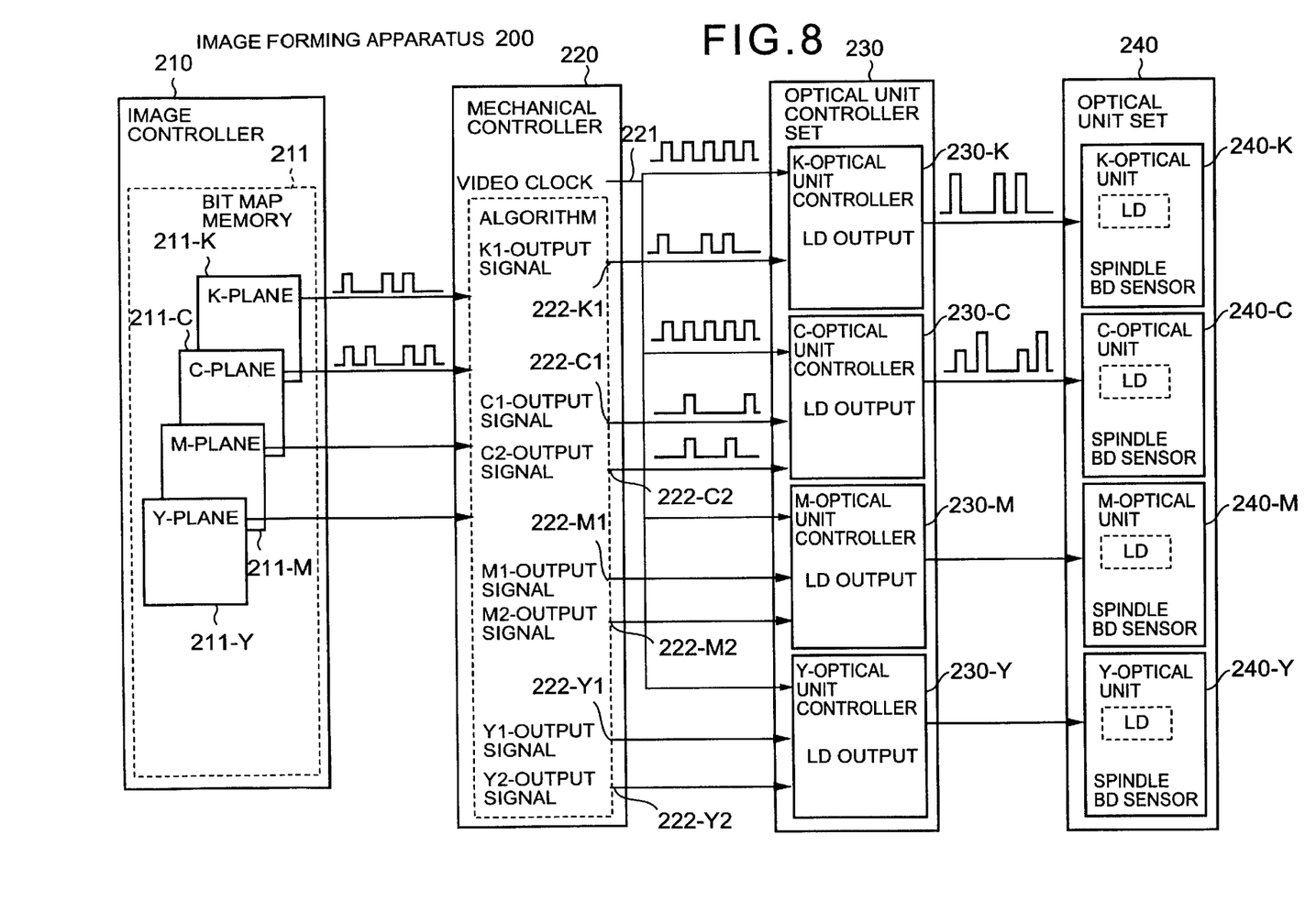
FIG. 8 shows a diagram illustrating a construction of an image forming apparatus according to a second embodiment of the present invention.

FIG. 8 shows a diagram illustrating a construction of an image forming apparatus according to a second embodiment of the present invention.

Referring to FIG. 8, the image forming apparatus 200 has mainly an image controller 210 to convert an original image to a bit map, a mechanical controller 220 to send dot signals synchronized with a video clock, an optical unit controller set 230 to supply dot signals in accordance with predetermined laser power strengths, and an optical unit set 240 to apply optical dot signals.

The image controller 210 develops each color's bit map in a bit map memory 211. Four developed bit maps for four colors, a K-plane 211-K, a C-plane 211-C, an M-plane 211-M, and a Y-plane 211-Y, are converted to dot signals and sent to the mechanical controller 220.

The mechanical controller 220 includes a video clock 221 to synchronize the dot signals after having received the dot signals; and an algorithm 222 to switch to a second output signal when cyan, magenta, or yellow is for secondary colors and is relatively more conspicuous color than other colors.

The algorithm 222 judges whether a received dot signal is for a relatively conspicuous color. When the received dot signal is for a relatively conspicuous color, the algorithm 222 switches to the second output signal. When the received dot signal is for a single color or an inconspicuous color, the algorithm 222 switches to a first output signal.

In detail, when the received dot signal is to be a single color or an inconspicuous color, the mechanical controller 221 transmits a corresponding one of a K1-output signal 222-K1, a C1-output signal 222-C1, an M1-output signal 222-M1, and a Y1-output signal 222-Y1, to the optical unit controller set 230 by synchronizing the video clock 221.

When the received dot signal is for a relatively conspicuous color, the mechanical controller 221 transmits a corresponding one of a K2-output signal 222-K2, a C2-output signal 222-C2, an M2-output signal 222-M2, and a Y2-output signal 222-Y2, to the optical unit controller set 230 by synchronizing the video clock 221.

Figure 9:
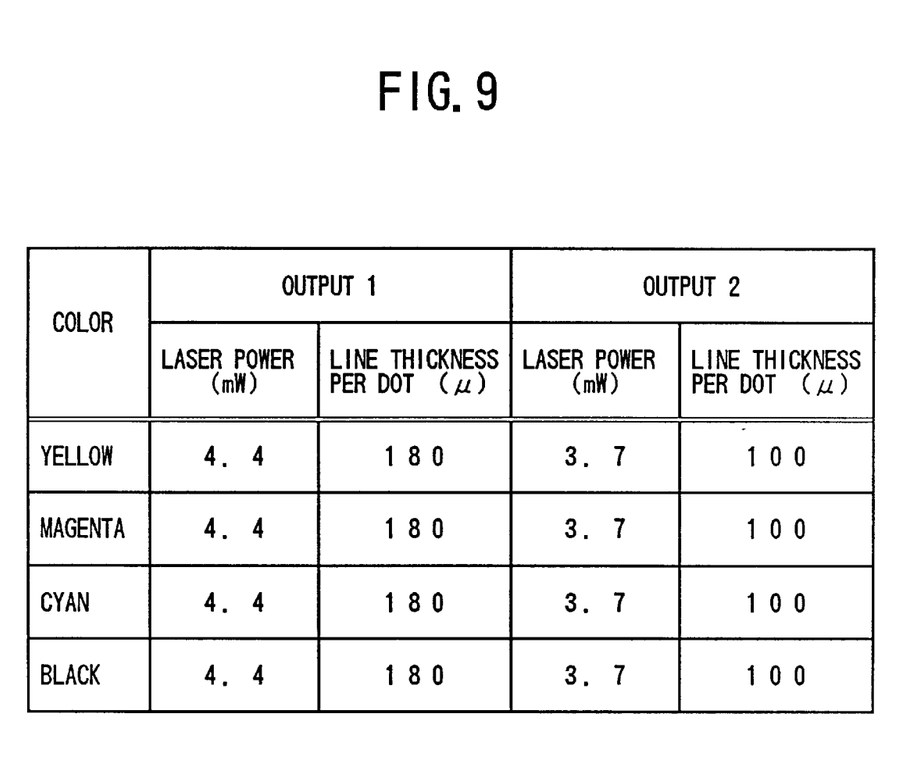
FIG. 9 shows a table of laser power strength and line thickness for each color, according to the second embodiment of the present invention.

The optical unit controller set 230 converts a received signal to an electric dot signal with a pulse amplitude corresponding to a predetermined laser power strength for each color as shown in FIG. 9, to be explained later. The electric dot signal of each color is sent to the optical unit set 240 from a corresponding one of LD outputs: an LD output 230-K, an LD output 230-C, an LD output 230-M, and an LD output 230-Y.

The optical unit set 240 includes a K-20 optical unit 240-K. a C-optical unit 240-C, an M-optical unit 240-M, and a Y-optical unit 240-Y. Each of the optical units has a spindle BD sensor. In this sense, the optical units correspond to the laser beam devices as shown in FIG. 2. Each of the optical units converts a received electric dot signal to an optical dot signal and then emits the optical dot signal on a corresponding one of the photosensitive drums as shown in FIG. 2 to form a photostatic latent image.

An example of a predetermined laser power strength corresponding to one dot for each color will now be described with reference to FIG. 9.

FIG. 9 shows a table of laser power strength and line thickness for each color, according to the second embodiment of the present invention.

In FIG. 9, the example is of a case of an electrophotography with a 240-dpi resolution. In this example, laser power (mW) and line thickness ($\mu$m) per dot are shown for each color.

Referring to the table in FIG. 9, when any one of yellow, magenta, cyan and black is printed via a corresponding one of the K1-output signal, C1-output signal, M1-output signal, and Y1-output signal in a case of a single color print or an inconspicuous color print, a 4.4-mW laser signal is emitted resulting in an output image of the color with a 180-$\mu$m line thickness per dot.

When any of yellow, magenta, cyan and black are printed via a corresponding one of the K2-output signal, C2-output signal, M2-output signal, and Y2-output signal in a case of a relatively conspicuous color print, a 3.7-mW laser signal is emitted resulting in an output image with a 100-m line thickness per dot.

Figure 10:
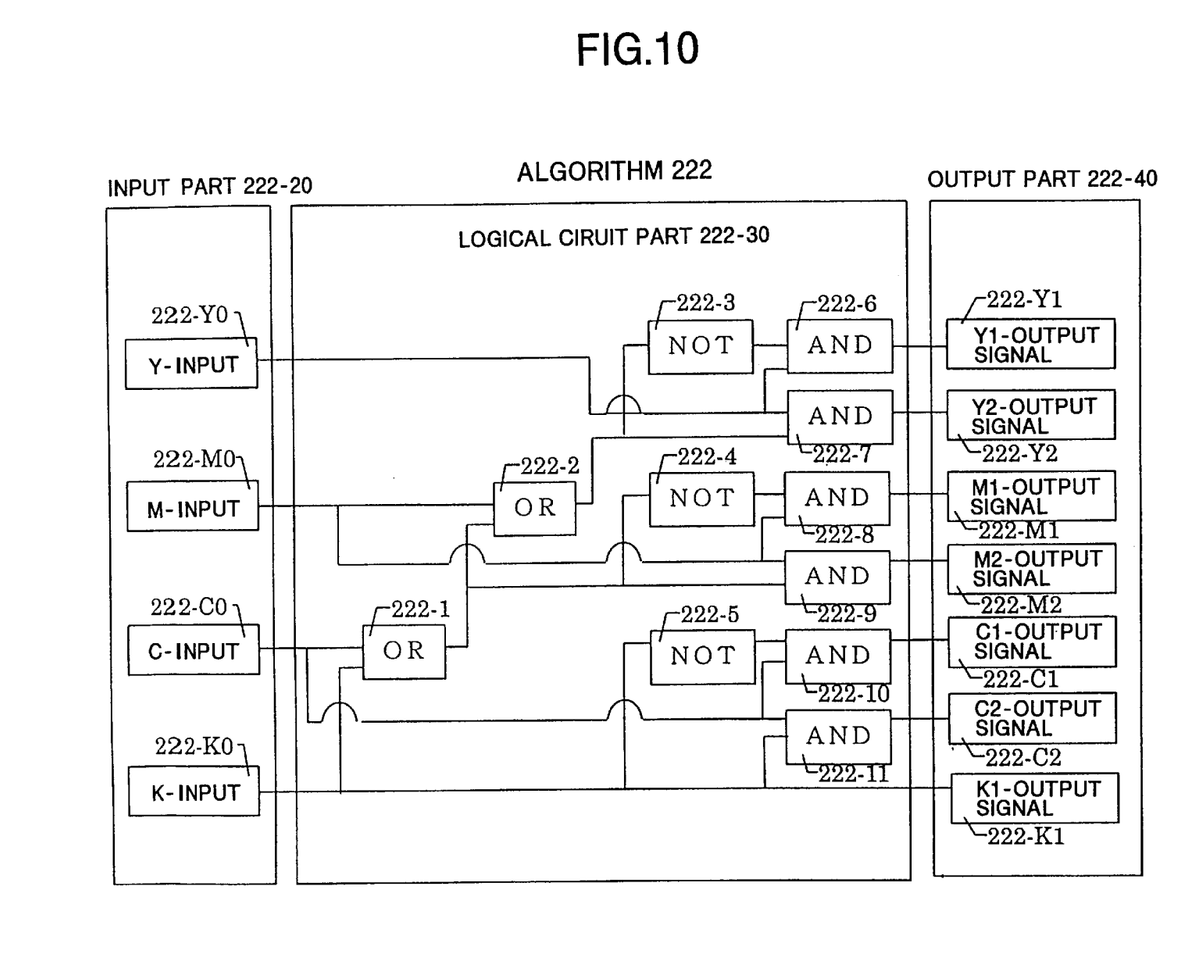
FIG. 10 shows a diagram illustrating a switching output algorithm according to the second embodiment of the present invention.

A detailed operation of the algorithm 222 will now be explained.

FIG. 10 shows a diagram illustrating a switching output algorithm according to the second embodiment of the present invention.

The algorithm 222 includes an input part 222-20 to receive a dot signal from the bit map memory 211, a logical circuit part 222-30 to judge whether a dot signal is for a relatively conspicuous color, and an output part 222-40 to transmit a dot signal to the optical unit controller set 230.

The input part 222-20 includes a Y-input 222-Y0, an M-input 222-M0, a C-input 222-C0, and a K-input 222-K0.

The Y-input 222-Y is to receive a dot signal of the Y-plane 211-Y for a yellow image from the bit map memory 211.

The M-input 222-M is to receive a dot signal of the M-plane 211-M for a magenta image from the bit map memory 211.

The C-input 222-C is to receive a dot signal of the C-plane 211-C for a cyan image from the bit map memory 211.

The K-input 222-K is to receive a dot signal of the K-plane 211-K for a black image from the bit map memory 211.

The logical circuit part 222-30 includes OR circuits 222-1 and 222-2; NOT circuits 222-3, 222-4, and 222-5; and AND circuits 222-6, 222-7, 222-8, 222-9. 222-10, and 222-11.

The OR circuit 222-1 outputs a logical addition of outputs of the C-input 222-C0 and the K-input 222-K0.

The OR circuit 222-2 outputs a logical addition of outputs of the M-input 222-M0 and the OR circuit 222-1.

The NOT circuit 222-3 reverses the output of the OR circuit 222-2.

The NOT circuit 222-4 reverses the output of the OR circuit 222-1.

The NOT circuit 222-5 reverses the output of the K-input 222-K0.

The AND circuit 222-6 outputs a logical multiplication of outputs of the Y-input 222-Y0 and the NOT 222-3.

The AND circuit 222-7 outputs a logical multiplication of the outputs of the Y-input 222-Y0 and the OR 222-2.

The AND circuit 222-8 outputs a logical multiplication of the outputs of the M-input 222-M0 and the NOT 222-4.

The AND circuit 222-9 outputs a logical multiplication of the outputs of the M-input 222-M0 and the OR 222-1.

The AND circuit 222-10 outputs a logical multiplication of the outputs of the C-input 222-C0 and the NOT 222-5.

The AND circuit 222-11 outputs a logical multiplication of the outputs of the C-input 222-C0 and the K-input 222-K0.

The output part 222-40 includes the Y1-output signal 222-Y1, the Y2-output signal 222-Y2, the M1-output signal 222-M1, the M2-output signal 222-M2, a C1-output signal 222-C1, a C2-output signal 222-C2, and K1-output signal 222-K1.

The Y1-output signal 222-Y1 transmits a dot signal when yellow is for a single color image.

The Y2-output signal 222-Y2 transmits a dot signal when yellow is for a relatively conspicuous color image.

The M1-output signal 222-M1 transmits a dot signal when magenta is for a single color image or when magenta is overlapped with a yellow image.

The M2-output signal 222-M2 transmits a dot signal when magenta is for a relatively conspicuous color image.

The C1-output signal 222-C1 transmits a dot signal when cyan is for a single color image or when cyan is overlapped with a yellow or magenta color image.

The C2-output signal 222-C2 transmits a dot signal when cyan is for a relatively conspicuous color image.

The K1-output signal 222-K1 transmits a dot signal whenever the K-input 222-K0 receives a dot signal of the K-plane 211-K for a black image from the bit map memory 211 regardless of whether the dot signal is for a single color image or for a relatively conspicuous color image.

In this embodiment, a judgment as to whether a color is defined as a single color or as a relatively conspicuous color is based on the above-mentioned inequality (ii). In the inequality (ii), when a color is located to the right of any color being overlapped, the 1-output signal corresponding to the color is emitted. When a color is located to the left of any color being overlapped, the 2-output signal corresponding to the color is emitted.

Alternately, the algorithm 222 may be constructed such that one 1-output signal is assigned only for the most conspicuous color of overlapped colors and 2-output signals are assigned for the other colors. Hence, the present invention is not limited to the above four colors but can apply to any number of colors.

A detailed description of varying a laser power strength is found in Japanese Laid-Open Patent Applications No. 62-261274 and No. 8-300728.

As mentioned above, the present invention provides a color printer which can prevent deterioration caused by a color displacement by a simple construction and which can improve an image quality at a low cost.

Of course, the present invention is not limited to a color printer using the electrophotography described in the first and second embodiments, but the present invention can apply to any of apparatuses which form color images by overlapping colors and can achieve a high quality of color images.

The present invention is not limited to the specifically disclosed embodiments, variations and modifications, and other variations and modifications may be made without departing from the scope of the present invention.

The present application is based on Japanese Priority Application No. 11-053305 filed on Mar. 1, 1999, the entire contents of which are hereby incorporated by reference.

What is claimed is:

1. An image forming apparatus comprising:
   a processing part forming a color output image from an input image by overlapping areas of different colors with each other,
   wherein said areas of the different colors have different sizes based on a conspicuous color order caused by a color displacement.

2. The image forming apparatus as claimed in claim 1, wherein said processing part forms said color output image by overlapping areas of at least two colors from among such colors as yellow, magenta, cyan and black such that at least one of the following conditions is satisfied:

condition (1): a yellow area is smaller than a magenta area;

condition (2): a magenta area is smaller than a cyan area;

condition (3): a yellow area is smaller than a cyan area;

condition (4): a yellow area is smaller than a black area;

condition (5): a magenta area is smaller than a black area; and     condition (6): a cyan area is smaller than a black area.

3. The image forming apparatus as claimed in claim 1, wherein said areas are dot areas.

4. The image forming apparatus as claimed in claim 1, wherein said processing part comprises:

an area controlling part controlling said areas of said different colors by emitting different optical powers based on said conspicuous color order so that said areas of said different colors have different sizes.

5. The image forming apparatus as claimed in claim 4, wherein said area controlling part controls said areas of said different colors such that the most conspicuous color has a smallest area in said different colors.

6. The image forming apparatus as claimed in claim 1, further comprising:

a secondary color Judging part judging whether said areas are to form a secondary color;

whereby when said areas are to form the secondary color, said processing part is enabled.

7. A method for forming an image comprising the steps of:

(a) forming a color output image from an input image by overlapping areas of different colors with each other, wherein said areas of the different colors have different sizes based on a conspicuous color order caused by a color displacement.

8. The method as claimed in claim 7, wherein said step (a) forms said color output image by overlapping areas of at least two colors from among such colors as yellow, magenta, cyan and black such that at least one of the following conditions is satisfied:

condition (1): a yellow area is smaller than a magenta area;

condition (2): a magenta area is smaller than a cyan area;

condition (3): a yellow area is smaller than a cyan area;

condition (4): a yellow area is smaller than a black area;

condition (5): a magenta area is smaller than a black area; and     condition (6): a cyan area is smaller than a black area.

9. The method as claimed in claim 7, wherein said step (a) comprises the steps of (b) controlling said areas of said different colors by emitting different optical powers based on said conspicuous color order.

10. The method as claimed in claim 9, wherein said step (b) controls said areas of said different colors such that the most conspicuous color has a smallest area in said different colors.

11. The method as claimed in claim 7, further comprising the steps of:

judging whether said areas are to form a secondary color;

whereby when said areas are to form the secondary color, said step (a) is performed.

\* \* \* \* \*